US008603651B2

(12) United States Patent
Takahoshi et al.

(10) Patent No.: US 8,603,651 B2
(45) Date of Patent: Dec. 10, 2013

(54) PERPENDICULAR MAGNETIC RECORDING MEDIUM AND MAGENTIC RECORDING AND REPRODUCING APPARATUS

(75) Inventors: Hideaki Takahoshi, Ichihara (JP); Takahiro Ukai, Ichihara (JP)

(73) Assignee: Showa Denko K.K., Tokyo (JP)

(*) Notice: Subject to any disclaimer, the term of this patent is extended or adjusted under 35 U.S.C. 154(b) by 144 days.

(21) Appl. No.: 13/214,855

(22) Filed: Aug. 22, 2011

(65) Prior Publication Data

US 2012/0050914 A1    Mar. 1, 2012

(30) Foreign Application Priority Data

Aug. 26, 2010 (JP) .................... 2010-189729

(51) Int. Cl.
*G11B 5/66* (2006.01)

(52) U.S. Cl.
USPC .................... 428/831.2; 360/135

(58) Field of Classification Search
None
See application file for complete search history.

(56) References Cited

U.S. PATENT DOCUMENTS

| 2007/0026260 A1* | 2/2007 | Nemoto et al. ............ 428/831 |
| 2010/0002326 A1* | 1/2010 | Van Drent ................. 360/31 |
| 2010/0196740 A1* | 8/2010 | Ayama et al. ............. 428/827 |
| 2010/0279151 A1* | 11/2010 | Sakamoto et al. ......... 428/828 |

FOREIGN PATENT DOCUMENTS

| JP | 07-244831 A | 9/1995 |
| JP | 2669529 B2 | 7/1997 |
| JP | 2003-123239 A | 4/2003 |
| JP | 2007-035139 A | 2/2007 |
| JP | 2007-179598 A | 7/2007 |
| JP | 2007-272990 A | 10/2007 |
| JP | 2009-099247 A | 5/2009 |
| JP | 2010-092525 A | 4/2010 |
| WO | 2007/129687 A1 | 11/2007 |
| WO | 2008/068536 A1 | 6/2008 |
| WO | WO2009/051090 * | 4/2009 |

OTHER PUBLICATIONS

Notice of Reasons for Rejection mailed May 7, 2013, issued by the Japanese Patent Office in corresponding Japanese Patent Application No. 2011-56625.

* cited by examiner

*Primary Examiner* — Holly Rickman
(74) *Attorney, Agent, or Firm* — Sughrue Mion, PLLC

(57) ABSTRACT

A perpendicular magnetic recording medium that is excellent in terms of electromagnetic conversion characteristics and can achieve the demand for the recording density growth, and a magnetic recording and reproducing apparatus provided with the perpendicular magnetic recording medium are provided. The perpendicular magnetic recording medium has at least a backing layer, an underlayer, an intermediate layer, and a perpendicular magnetic recording layer sequentially laminated on a non-magnetic substrate, in which the backing layer includes at least a soft magnetic film having an amorphous structure; the underlayer includes a first underlayer and a second underlayer laminated from the non-magnetic substrate side; the first underlayer is an fcc-structured alloy layer including an fcc-structured element and a bcc-structured element, the second underlayer includes a NiW alloy; and the intermediate layer includes Ru or a Ru alloy.

5 Claims, 1 Drawing Sheet

PERPENDICULAR MAGNETIC RECORDING MEDIUM AND MAGENTIC RECORDING AND REPRODUCING APPARATUS

BACKGROUND OF THE INVENTION

1. Field of the Invention

The present invention relates to a perpendicular magnetic recording medium and to a magnetic recording and reproducing apparatus which are used for hard disk drives (HDD) or the like.

Priority is claimed on Japanese Patent Application No. 2010-189729, filed Aug. 26, 2010, the content of which is incorporated herein by reference.

2. Description of Related Art

The method of perpendicular magnetic recording is a method suitable for improving surface recording density since, in this method, axes of magnetization in the magnetic recording layer, which were aligned in the in-plane direction of the medium in the past, are aligned in the perpendicular direction to a medium easily, so that demagnetizing fields in the vicinity of magnetic transition regions, which are the borders between recording bits, become small; and therefore, the medium becomes more stable magnetostatically as the recording density increases, and thus the thermal fluctuation resistance is improved.

A perpendicular magnetic recording medium is manufactured by laminating a backing layer, an underlayer, an intermediate layer, and a perpendicular magnetic recording layer sequentially on a non-magnetic substrate. When the backing layer including a soft magnetic material is provided between the non-magnetic substrate and the perpendicular magnetic recording layer, the medium acts as a so-called perpendicular two-layered medium, and thus can obtain a high recording capability. At this time, the soft magnetic backing layer plays the role of reversing the recording magnetic field from a magnetic head, and thus can improve the recording and reproducing efficiency.

In addition, since the underlayer is a dominant element that determines the particle sizes or orientations of the intermediate layer and the perpendicular magnetic recording layer provided thereon, selection of the material is extremely critical in determining the recording and reproducing characteristics of a magnetic recording media. Therefore, a variety of materials are available as the underlayer. For example, it is possible to use an hcp-structured material or an fcc-structured material, such as a Ti alloy (for example, see Japanese Patent No. 2669529) or a NiFeCr alloy (for example, see JP-A-2003-123239), or an amorphous structured material, such as Ta. In addition, JP-A-2010-92525 describes the use of an alloy including, as the underlayer, one of Ni, Cu, Pt, and Pd as the main component and additive elements of one or more of Ti, V, Ta, Cr, Mo, and W.

It is suggested that Ru be used as the intermediate layer (see JP-A-7-244831). In addition, it is known that, since Ru has dome-shaped protrusions formed on the top portion of columnar crystals, Ru has an effect of growing the crystal particles of the recording layer or the like on the protrusions, promoting the isolated structure of the grown crystal particles, isolating the crystal particles, and thus growing magnetic particles in a columnar shape (see JP-A-2007-272990).

SUMMARY OF THE INVENTION

The present applicant suggests a perpendicular magnetic recording medium with a high recording density by forming an amorphous structure in a soft magnetic film that composes the backing layer, and using a NiW alloy for the underlayer, in which the crystal sizes in the intermediate layer, which is formed on the underlayer and includes, for example, Ru or a Ru alloy, are reduced and become uniform, the consistency in crystal lattice sizes in the intermediate layer is increased, an isolated structure is promoted in growing columnar crystals, and, furthermore, magnetic particles formed thereon are isolated (see JP-A-2007-179598).

However, the demand for the recording density growth of a magnetic recording medium is continuously rising, and thus there is demand for a magnetic recording medium which can realize the higher recording density than ever.

The invention has been made in consideration of the above circumstances in the related art, and the object of the invention is to provide a perpendicular magnetic recording medium in which, by refining the crystal particles and making the particle size distribution uniform in the underlayer including a NiW alloy, crystal particles are refined, a particle size distribution is uniformed, and an orientation is improved in the intermediate layer and the recording layer formed on the underlayer; electromagnetic conversion characteristics are excellent; and the demand for the recording density growth can be achieved, and an magnetic recording and reproducing apparatus provided with the perpendicular magnetic recording medium.

(1) A perpendicular magnetic recording medium having at least a backing layer, an underlayer, an intermediate layer, and a perpendicular magnetic recording layer sequentially laminated on a non-magnetic substrate, in which the backing layer includes at least a soft magnetic film having an amorphous structure, the underlayer is composed of a first underlayer and a second underlayer laminated from the non-magnetic substrate side, the first underlayer is an fcc-structured alloy layer including an fcc-structured element and a bcc-structured element, the second underlayer includes a NiW alloy, and the intermediate layer includes Ru or a Ru alloy.

(2) The media for perpendicular magnetic recording according to the above (1), in which the first underlayer is any of a PdV alloy or a CuW alloy.

(3) The media for perpendicular magnetic recording according to the above (2), in which the amount of V included in the PdV alloy is in a range of 1 atom % to 65 atom %.

(4) The media for perpendicular magnetic recording according to the above (2), in which the amount of W included in the CuW alloy is in a range of 1 atom % to 40 atom %.

(5) An magnetic recording and reproducing apparatus provided with the perpendicular magnetic recording medium according to any one of the above (1) to (4), and a single magnetic pole head that writes information on the perpendicular magnetic recording medium.

According to the invention, it is possible to provide a perpendicular magnetic recording medium in which, by forming an underlayer into a two-layered structure composed of a first underlayer being an fcc-structured alloy layer including an fcc-structured element and a bcc-structured element, and a second underlayer including a NiW alloy layer, crystal particles are refined in an intermediate layer and a perpendicular magnetic recording layer, formed on the underlayer, a particle size distribution is uniform, and an orientation is improved; electromagnetic conversion characteristics are excellent; and the demand for the recording density growth can be achieved.

DETAILED DESCRIPTION OF THE INVENTION

Figure 1:
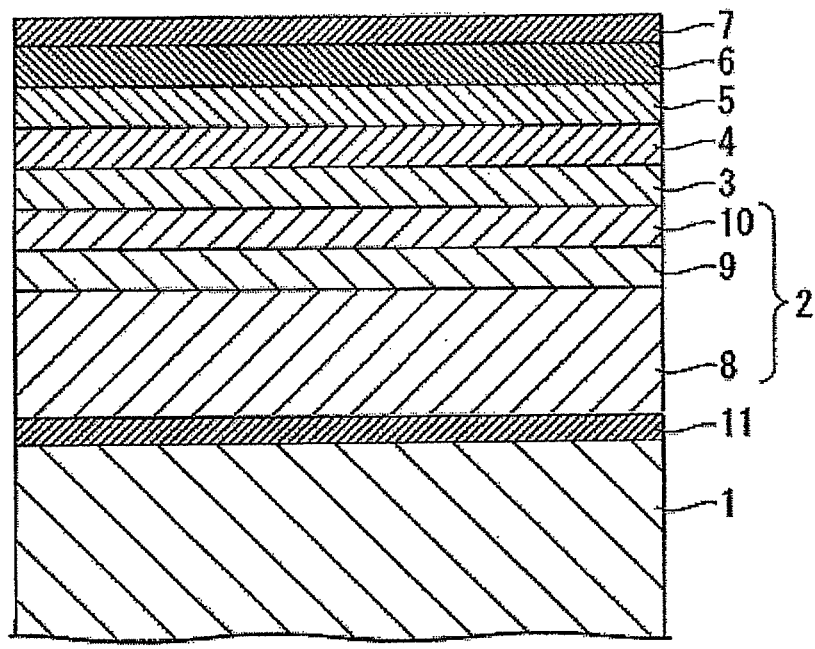
FIG. 1 is a cross-sectional view showing an example of a perpendicular magnetic recording medium to which the invention is applied.

Hereinafter, a perpendicular magnetic recording medium and a magnetic recording and reproducing apparatus, to which the invention is applied, will be described in detail with reference to the drawings.

In the drawings used in the description below, in order to provide an easier understanding of the features, there are cases in which featured portions are enlarged for convenience, and therefore the dimension ratios or the like of the respective components will not necessarily reflect the actual size.

(Perpendicular Magnetic Recording Medium)

The perpendicular magnetic recording medium to which the invention is applied has a configuration, for example, as shown in FIG. 1, in which an adhesion layer 11, a backing layer 2, a first underlayer 3 (underlayer), a second underlayer 4 (underlayer), an intermediate layer 5, a perpendicular magnetic recording layer 6, and a protective layer 7 are sequentially laminated on each of both surfaces of a non-magnetic substrate 1, and a lubricant film (not shown in FIG. 1) is formed on the top layer. FIG. 1 shows only one surface of the non-magnetic substrate 1.

Among them, as the non-magnetic substrate 1, for example, a metal substrate made of a metallic material, such as aluminum or an aluminum alloy, or a non-metallic substrate made of a nonmetallic material, such as glass, ceramic, silicon, silicon carbide, or carbon, may be used.

In addition, as a glass substrate composing the non-magnetic substrate 1, for example, it is possible to use amorphous glass or crystalline glass, and, furthermore, as the amorphous glass, it is possible to use soda lime glass, aluminosilicate glass, or the like, which are commonly used. On the other hand, as the crystalline glass, it is possible to use lithium-based crystallized glass or the like.

The non-magnetic substrate 1 preferably has an average surface roughness Ra of 0.8 nm or smaller, and preferably 0.5 nm or smaller from the standpoint of growing the recording density. In addition, the non-magnetic substrate 1 preferably has a fine wave (Wa) on the surface of 0.3 nm or smaller, and preferably 0.25 nm or smaller from the standpoint that high recording density recording can be performed with a magnetic head slightly floated. As such, by flattening the surface of the non-magnetic substrate 1, the crystal orientations in the intermediate layer 5 and the perpendicular magnetic recording layer 6 are increased, the recording and reproducing characteristics are improved, and it becomes possible to perform recording with the head slightly floated.

In addition, since the non-magnetic substrate 1 is in contact with the backing layer 2 including Co or Fe as the main component as described below, corrosion may occur due to the influence of gas or moisture attached to the surfaces, the diffusion of substrate components, or the like. Therefore, it is preferable to provide the adhesion layer 11 between the non-magnetic substrate 1 and the backing layer 2. Meanwhile, as a material for the adhesion layer 11, for example, it is possible to appropriately select Cr, a Cr alloy, Ti, a Ti alloy, or the like. In addition, the thickness of the adhesion layer 11 is preferably 2 nm or larger, and more preferably 30 nm or smaller.

The backing layer 2 has a structure in which a first soft magnetic film 8, a Ru film 9, and a second soft magnetic film 10 are sequentially laminated. That is, the backing layer 2 has a structure in which the Ru film 9 is interposed between two soft magnetic films 8 and 10 so that the soft magnetic films 8 and 10 on and below the Ru film 9 form an anti-ferro coupling (AFC) bonding. Thereby, it is possible to enhance the resistance against external magnetic fields and the resistance against the wide area tack erasure (WATE) phenomenon, which is an intrinsic problem of perpendicular magnetic recording.

The first and second soft magnetic films 8 and 10 include, for example, a CoFe alloy. By using a CoFe alloy for the soft magnetic films 8 and 10, it is possible to realize a high saturation magnetic flux density Bs (1.4 (T) or higher), and, by using the first underlayer 3 and the second underlayer 4 as described below, it is possible to obtain superior recording and reproducing characteristics. Meanwhile, when the first and second soft magnetic films 8 and 10 are formed, it is preferable to form CoFe alloy films by the sputtering method in a state in which the magnetic field is applied in the radical direction of the non-magnetic substrate 1.

In addition, it is preferable to add any of Zr, Ta, and Nb to the CoFe alloy. Thereby, it becomes possible to accelerate the process of the CoFe alloy becoming amorphous and improve the orientation of a NiW alloy. In addition, the amount of Zr, Ta, and Nb added to the CoFe alloy is preferably in a range of 3 atom % to 15 atom %, and more preferably in a range of 5 atom % to 10 atom %.

The content of Fe in the CoFe alloy is preferably in a range of 5 atom % to 60 atom %. When the content of Fe is less than 5 atom %, the saturation magnetic flux density Bs of the backing layer 2 is decreased, which is not preferable. On the other hand, when the content of Fe exceeds 60 atom %, the corrosion resistance of the backing layer 2 is deteriorated, which is not preferable.

The thickness of the backing layer 2 is preferably in a range of 15 nm to 80 nm, and more preferably in a range of 20 nm to 50 nm. When the thickness of the backing layer 2 is less than 20 nm, it is not possible to sufficiently absorb magnetic fluxes from the magnetic head so that data cannot be written sufficiently, and thus the recording and reproducing characteristics are deteriorated, which is not preferable. On the other hand, when the thickness of the backing layer 2 exceeds 80 nm, the productivity is significantly decreased, which is not preferable.

In addition, in the backing layer 2, by forming an amorphous structure in the first and second soft magnetic films 8 and 10, it is possible to prevent the surface roughness Ra from coarsening. Thereby, it becomes possible to reduce the degree of floating of the magnetic head, and thus it becomes possible to further increase the recording density.

Here, when "Hbias" is defined as an index indicating the degree of the AFC bonding in the first and second soft magnetic films 8 and 10 which composes the backing layer 2, the backing layer 2 preferably has a value of Hbias of 80 (Oe) or larger, and preferably 300 (Oe) or smaller. Thereby, it is possible to increase the external magnetic field resistance and the WATE resistance. In the "Hbias," since the saturation magnetic flux density is defined as Ms, and a magnetic field with a half value of the saturation magnetic flux density Ms is defined as Ms/2, it is possible to satisfy the above value of Hbias by using the above materials for the first and second soft magnetic films 8 and 10 so that the thickness of the Ru film 9 provided between the soft magnetic films 8 and 10 is made to be a predetermined thickness (for example, 0.6 nm to 0.8 nm).

In addition, the first and second soft magnetic films 8 and 10 preferably have a Hbias of 10 (Oe) or smaller, and more preferably 5 (Oe) or smaller. Meanwhile, 1 (Oe) is equivalent to about 79 A/m.

The first underlayer 3 and the second underlayer 4 are provided to control the orientations and crystal sizes of the intermediate layer 5 and the perpendicular magnetic recording layer 6 provided thereon, and are provided in order to increase the perpendicular component of the magnetic flux generated from the magnetic head to the substrate surface and in order to further strongly fix the orientation of the magnetization in the perpendicular magnetic recording layer 6, on which information is recorded, in a direction perpendicular to the non-magnetic substrate 1. That is, the reason why it is difficult to achieve a perpendicular orientation in the magnetic recording layer even when the intermediate layer and the magnetic recording layer are provided directly on the second soft magnetic film 10 since the second soft magnetic film 10 has an amorphous structure.

Since a NiW alloy is used for the underlayer, it is possible to form a perpendicular magnetic recording layer by growing hcp-structured magnetic particles having a high tendency of orientating along the c axis on the underlayer (see JP-A-2007-179598). As a result of studying how to achieve the additional refinement, uniform size distribution, and improved orientation of the crystal particles in the perpendicular magnetic recording layer in addition to the improvement in the underlayer including a NiW alloy, the present inventors found that the above can be realized by forming the underlayer into a two-layered structure of an fcc-structured alloy layer including an fcc-structured element and a bcc-structured element and a NiW alloy layer. The reason is considered that, by providing an fcc-structured alloy layer including an fcc-structured element and a bcc-structured element between the amorphous structured second soft magnetic film 10, which composes the backing layer 2, and the NiW alloy layer mainly having an fcc structure, the shapes of the fine crystal particles of the NiW alloy mainly having an fcc structure are further stably formed, and the particle size distribution of the crystals of the NiW alloy is also made to be uniform.

As such, by improving the crystal structure of the second underlayer 4 including a NiW alloy, it becomes possible to realize a perpendicular magnetic recording medium, in which crystal particles in the intermediate layer 5 and the perpendicular magnetic recording layer 6 laminated on the second underlayer are refined, a particle size distribution is uniform, and an orientation is improved; electromagnetic conversion characteristics are excellent; and the demand for the recording density growth can be achieved.

Specific examples of the fcc-structured element that composes the first underlayer 3 of the invention are Ni, Cu, Rh, Pd, Ag, Ir, Pt, Au, and Al, and specific examples of the bcc-structured element are V, Cr, Fe, Nb, Mo, Ta, W, and Ti. The fcc-structured element refers to an element forming the fcc structure in a stable state, and, similarly, the bcc-structured element refers to an element forming the bcc structure in a stable state. Although it has been known that Ti forms the hcp structure in an equilibrium state, when the layer is formed in a non-equilibrium state (rapid cooling state) by, for example, a sputtering film forming method, Ti may form bcc structure as β-Ti to be in a stable state.

Preferable alloys combining the above elements are a PdV alloy or a CuW alloy having the fcc structure, in which the amount of V in the PdV alloy is particularly preferably in a range of 1 atom % to 65 atom %, and most preferably in a range of 40 atom % to 50 atom %, and the amount of W in the CuW alloy is particularly preferably in a range of 1 atom % to 40 atom %, and most preferably in a range of 10 atom % to 15 atom %.

The thickness of the first underlayer 3 is preferably in a range of 1 nm to 5 nm. When the thickness of the first underlayer 3 is less than 1 nm, the effects of the invention become insufficient, and thus the effect of making the crystal diameters of the NiW alloy layer in the second underlayer refined and uniform is degraded. On the other hand, when the thickness of the first underlayer 3 exceeds 5 nm, the crystal sizes of the second underlayer 4 are increased, which is not preferable.

In the invention, the second underlayer 4 is including a NiW alloy. The content of W in the NiW alloy is preferably in a range of 3 atom % to 10 atom %.

When the content of W in the NiW alloy is either less than 3 atom % or more than 10 atom %, the effect of controlling the orientation and crystal size of the perpendicular magnetic recording medium is degraded, which is not preferable.

Meanwhile, for the purpose of reducing the crystal sizes and increasing the consistency with crystal lattice sizes of the intermediate layer 5, it is possible to add other elements to the NiW alloy. For example, for the purpose of reducing the crystal sizes, B, Mn, or the like may be added, and, in this case, the content of B and Mn is preferably 6 atom % or less, and more preferably 1 atom % or more. In addition, for the purpose of increasing the consistency with crystal lattice sizes of the intermediate layer 5, it is possible to add Ru, Pt, Mo, Ta, or the like. In this case, the content of Ru, Pt, Mo, and Ta is preferably 40 atom % or less and 1 atom % or more.

The thickness of the second underlayer 4 is preferably in a range of 2 nm to 20 nm. When the thickness of the second underlayer 4 is less than 2 nm, the effects become insufficient, and thus the effect of refining the crystal diameters cannot be obtained, and the orientation is also deteriorated, which is not preferable. On the other hand, when the thickness of the second underlayer 4 exceeds 20 nm, the crystal sizes are increased, which is not preferable.

The intermediate layer 5 is a layer for forming the perpendicular magnetic layer into columnar crystals oriented along the c axis, and the growth surface has a dome shape. Such an intermediate layer 5 can be formed by including Ru or a Ru alloy. Examples of the Ru alloy can include a RuCo alloy, a RuAl alloy, a RuMn alloy, a RuMo alloy, and a RuFe alloy. The amount of Ru in the Ru alloy is preferably 50 atom % or more and 90 atom % or less.

The thickness of the intermediate layer 5 is 30 nm or smaller, preferably 16 nm or smaller, and preferably 5 nm or larger. When the thickness of the intermediate layer 5 is thin, the distance between the magnetic head and the backing layer 2 becomes short, and thus it is possible to make the magnetic flux from the magnetic head steep. As a result, it is possible to further reduce the thickness of the backing layer 2, and thus it becomes possible to improve the productivity.

The perpendicular magnetic recording layer 6 is composed of magnetic films in which the easy axes of magnetization are aligned in the perpendicular direction to the substrate surface. The perpendicular magnetic recording layer 6 includes at least Co and Pt, and, furthermore, an oxide or Cr, B, Cu, Ta, Zr, or the like may be added for the purpose of improving SNR characteristics. In addition, examples of the oxide can include $SiO_2$, SiO, $Cr_2O_3$, CoO, $Ta_2O_3$, $TiO_2$, or the like.

The volume fraction of the oxide in the perpendicular magnetic recording layer 6 is preferably 15 volume % to 40 volume %, and more preferably 25 volume % to 35 volume %. When the volume fraction of the oxide is less than 15 volume %, the SNR characteristics become insufficient, which is not preferable. On the other hand, when the volume fraction of the oxide exceeds 40 volume %, it is not possible to obtain a coercive force enough to respond the high recording density, which is not preferable.

The new creation magnetic field (−Hn) of the perpendicular magnetic recording layer 6 is preferably 2.0 (kOe) or higher and 3.0 (kOe) or lower. When the −Hn is less than 2.0 (kOe), thermal fluctuation occurs, which is not preferable.

The thickness of the perpendicular recording layer 6 is preferably in a range of 6 nm to 20 nm. For example, when the thickness of an oxide granular layer is within the above range, a sufficient output can be secured, and no deterioration of OW characteristics occurs, which is preferable.

The perpendicular magnetic recording layer 6 can have a single-layer structure or a structure of two or more layers made of materials of different compositions.

The protective layer 7 is provided to prevent the corrosion of the perpendicular magnetic recording 6, and also to prevent damage to the medium surface when the magnetic head contact with the medium. It is possible to use a material including a well-known material in the related art, for example, C, $SiO_2$, or $ZrO_2$. The thickness of the protective layer 7 is desirably within the range of 1 nm to 5 nm from the standpoint of a high recording density, since the distance between the magnetic head and the medium surface can be reduced.

For the lubricant film coated on the top layer, it is possible to use a well-known material in the related art, for example, perfluoropolyether, fluorinated alcohol, fluorinated carboxylic acid, or the like.

(Magnetic Recording and Reproducing Apparatus)

Figure 2:
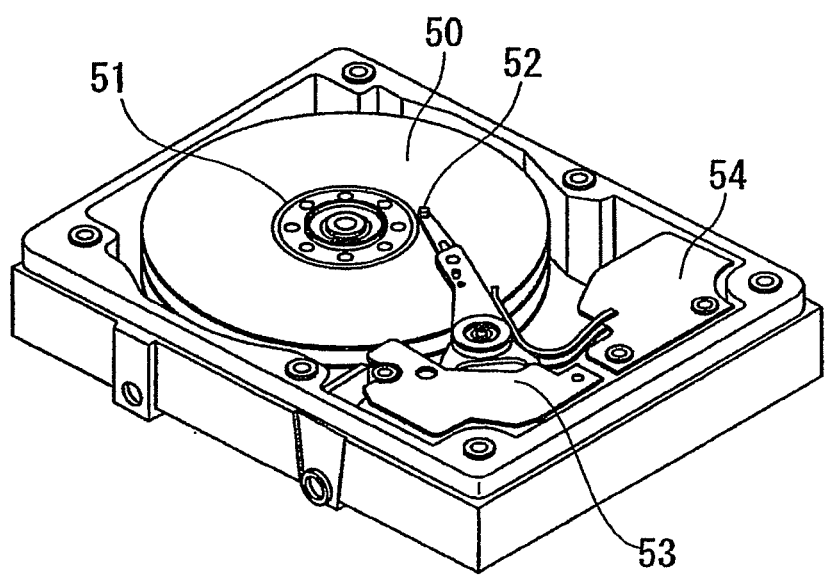
FIG. 2 is a perspective view showing an example of a magnetic recording and reproducing apparatus to which the invention is applied.

FIG. 2 is a view showing an example of a magnetic recording and reproducing apparatus to which the invention is applied.

The magnetic recording and reproducing apparatus is provided with a perpendicular magnetic recording medium 50 having the configuration shown in FIG. 1, a medium driving section 51 that rotary drive the perpendicular magnetic recording medium 50, a magnetic head 52 that records and reproduces information on the perpendicular magnetic recording medium 50, a head driving section 53 that moves the magnetic head 52 relative to the perpendicular magnetic recording medium 50, and a recording and reproducing signal processing section 54. In addition, the recording and reproducing signal processing section 54 can process data which is input from the outside and then transmit a recording signal to the magnetic head 52, and process a reproducing signal from the magnetic head 52 and then transmit data outside.

In the magnetic recording and reproducing apparatus to which the invention is applied, in order to satisfy the demand for an additional growth of the recording density of the perpendicular magnetic recording medium, a single magnetic pole head that is excellent in terms of a data-writing capability on the perpendicular magnetic recording layer 6 is used. Additionally, in the perpendicular magnetic recording medium, in order to support such a single magnetic pole head, the backing layer 2 is provided between the non-magnetic substrate 1 and the perpendicular magnetic recording layer 6 so as to improve the efficiency of the transportation of magnetic fluxes between the single magnetic pole head and the perpendicular magnetic recording layer 6.

In addition, in the magnetic recording and reproducing apparatus, it is possible to use the magnetic head 52 which has, as a reproducing element, a giant magnetoresistance (GMR) element or the like with the GMR effect and is more suitable for the high recording density.

The present invention is not necessarily limited to the above embodiments, and a variety of modifications can be added within the scope of the invention.

For example, the invention can also be applied to a perpendicular magnetic recording medium in which the perpendicular magnetic recording layer 6 has a magnetic recording pattern, the magnetic recording pattern being magnetically separated. Specifically, as a magnetic recording medium having a magnetic recording pattern, it is possible to use so-called patterned media, in which a magnetic recording pattern is disposed with a specific regularity for each bit, media in which a magnetic recording pattern is disposed in a track shape, media having a servo signal pattern, or the like.

EXAMPLES

Hereinafter, the effects of the invention will be further clarified using examples. The present invention is not limited to the examples below and can be appropriately modified within the scope of the invention for practical use.

In the present example, firstly, as a non-magnetic substrate, a glass substrate (with a diameter of 2.5 inches) was placed in the film forming chamber of a DC magnetron sputter (C-3010, manufactured by Anelva Corporation), and the film forming chamber was exhausted to vacuum of $1 \times 10^5$ Pa. On the glass substrate, a 4 nm-thick adhesion layer including 50Cr-50Ti (the content of Cr was 50 atom %, and the content of Ti was 50 atom %), a 20 nm-thick first soft magnetic film including 71Co-20Fe-5Zr-4Nb (the content of Co was 71 atom %, the content of Fe was 20 atom %, the content of Zr was 5 atom %, and the content of Nb was 4 atom %), a 0.8 nm-thick Ru film, and a 20 nm-thick second soft magnetic film including 71Co-20Fe-5Zr-4Nb were formed so as to form a backing layer. It was confirmed by XRD that the crystal structures of the soft magnetic films were an amorphous structure.

Next, on the backing layer, a 2 nm-thick first underlayer having each of the compositions and the crystal structures shown in Table 1 was formed, and, on the first underlayer, a 10 nm-thick second underlayer including a NiW alloy having each of the compositions shown in Table 1 was formed. On the second underlayer, a 12 nm-thick intermediate layer including Ru was formed, and, as a perpendicular magnetic recording layer, a 10 nm-thick 60Co-10Cr-20Pt-10$SiO_2$ layer and a 6 nm-thick 65Co-18Cr-14Pt-3B layer were formed. In addition, on the perpendicular magnetic recording layer, a 4 nm-thick protective layer including carbon was formed by the ion beam method, and then a lubricant layer including perfluoropolyether was formed by the dipping method, thereby obtaining a perpendicular magnetic recording medium of each of Examples 1 to 22.

In addition, on the media for perpendicular magnetic recording of Examples 1 to 22, the evaluation of recording and reproducing characteristics (SNR) and resolution characteristics (Res, which is a ratio of a low-frequency output (y) at 62.07 MHz to a high-frequency output (x) at 372.39 MHz ((x/y)×100), and shows that, as this value increases, the reproducibility of signals is more excellent) were performed. The evaluation results are shown in Table 1.

TABLE 1

| | First underlayer | | Second underlayer | Intermediate layer | Electromagnetic conversion characteristics | | Note |
|---|---|---|---|---|---|---|---|
| | Composition | Structure | Composition | Composition | SNR (dB) | Res (%) | |
| Example 1 | Pd | fcc | 94Ni6W | 100Ru | 15.31 | 45.58 | Comparative example |
| Example 2 | 99Pd1V | fcc | 94Ni6W | 100Ru | 15.65 | 46.51 | Invention example |
| Example 3 | 90Pd10V | fcc | 94Ni6W | 100Ru | 15.71 | 46.79 | Invention example |
| Example 4 | 80Pd20V | fcc | 94Ni6W | 100Ru | 15.77 | 47.01 | Invention example |
| Example 5 | 70Pd30V | fcc | 94Ni6W | 100Ru | 15.83 | 47.12 | Invention example |
| Example 6 | 60Pd40V | fcc | 94Ni6W | 100Ru | 15.92 | 47.55 | Invention example |
| Example 7 | 55Pd45V | fcc | 94Ni6W | 100Ru | 15.98 | 47.75 | Invention example |
| Example 8 | 45Pd55V | fcc | 94Ni6W | 100Ru | 15.91 | 47.49 | Invention example |
| Example 9 | 35Pd65V | fcc | 94Ni6W | 100Ru | 15.43 | 45.81 | Invention example |
| Example 10 | 30Pd70V | bcc | 94Ni6W | 100Ru | 15.02 | 44.53 | Comparative example |
| Example 11 | 45Cu55W | bcc | 94Ni6W | 100Ru | 15.11 | 44.58 | Comparative example |
| Example 12 | 60Cu40W | fcc | 94Ni6W | 100Ru | 15.61 | 46.81 | Invention example |
| Example 13 | 85Cu15W | fcc | 94Ni6W | 100Ru | 15.86 | 47.55 | Invention example |
| Example 14 | 90Cu10W | fcc | 94Ni6W | 100Ru | 15.96 | 47.70 | Invention example |
| Example 15 | 95Cu5W | fcc | 94Ni6W | 100Ru | 15.51 | 46.01 | Invention example |
| Example 16 | Cu | fcc | 94Ni6W | 100Ru | 15.22 | 45.54 | Comparative example |
| Example 17 | 50Cu50V | bcc | 94Ni6W | 100Ru | 14.82 | 44.35 | Comparative example |
| Example 18 | 95Pd5Cr | fcc | 94Ni6W | 100Ru | 15.61 | 46.44 | Invention example |
| Example 19 | 85Pd15Cr | fcc | 94Ni6W | 100Ru | 15.73 | 47.02 | Invention example |
| Example 20 | 70Pd30Cr | fcc | 94Ni6W | 100Ru | 15.89 | 47.65 | Invention example |
| Example 21 | 55Pd45Cr | fcc | 94Ni6W | 100Ru | 15.77 | 47.32 | Invention example |
| Example 22 | 90Cu10Ti | fcc | 94Ni6W | 100Ru | 15.95 | 47.65 | Invention example |

In the evaluation of recording and reproducing characteristics, recording frequency conditions were measured with a linear recording density of 1000 kFCI using a magnetic head provided with a single pole magnet in the recording section and a GMR element in the reproducing section.

As shown in Table 1, among Examples 1 to 22, for Examples 1, 10, 11, 16, and 17, which corresponded to comparative examples, it was evident that the recording and reproducing characteristics (SNR) and the resolution characteristics (Res) were low in comparison to other Examples, which corresponded to invention examples.

Therefore, it was found that Examples 2 to 9, 12 to 15, and 18 to 22, which corresponded to invention examples have excellent recording and reproducing characteristics (SNR) and resolution characteristics (Res).

According to the invention, it is possible to provide a perpendicular magnetic recording medium in which, by forming an underlayer into a two-layered structure composed of a first underlayer being an fcc-structured alloy layer including an fcc-structured element and a bcc-structured element, and a second underlayer including a NiW alloy layer, crystal particles are refined in an intermediate layer and a perpendicular magnetic recording layer, formed on the underlayer, a particle size distribution is uniform, and an orientation is improved; electromagnetic conversion characteristics are excellent; and the demand for the recording density growth can be achieved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A perpendicular magnetic recording medium comprising: at least a backing layer, an underlayer, an intermediate layer, and a perpendicular magnetic recording layer sequentially laminated on a non-magnetic substrate,
    wherein the backing layer includes at least a soft magnetic film having an amorphous structure,
    the underlayer includes a first underlayer and a second underlayer laminated from the non-magnetic substrate side, the first underlayer is an fcc-structured PdV alloy layer,
  wherein the amount of V included in the PdV alloy is within a range of 1 atom %,
the second underlayer includes a NiW alloy, and
the intermediate layer includes Ru or a Ru alloy.

2. A magnetic recording and reproducing apparatus provided with
  the perpendicular magnetic recording medium according to claim 1; and
  a single magnetic pole head that writes information on the perpendicular magnetic recording medium.

3. The media for perpendicular magnetic recording according to claim 1,
  wherein the amount of V included in the PdV alloy is within a range of 40 atom % to 50 atom %.

4. The media for perpendicular magnetic recording according to claim 1,
  wherein the thickness of the first underlayer is in a range of 1 nm to 5 nm.

5. The media for perpendicular magnetic recording according to claim 1,
  wherein the thickness of the second underlayer is in a range of 2 nm to 20 nm.

* * * * *

UNITED STATES PATENT AND TRADEMARK OFFICE
CERTIFICATE OF CORRECTION

Page 1 of 1

PATENT NO. : 8,603,651 B2
APPLICATION NO. : 13/214855
DATED : December 10, 2013
INVENTOR(S) : Hideaki Takahoshi and Takahiro Ukai It is certified that error appears in the above-identified patent and that said Letters Patent is hereby corrected as shown below:

In the Claims:

Column 11, Line 3: In Claim 1, delete "1 atom%" and insert --1 atom% to 65 atom%--

Signed and Sealed this
Twenty-seventh Day of May, 2014

Michelle K. Lee
*Deputy Director of the United States Patent and Trademark Office*